US006285797B1

(12) United States Patent
Lubin et al.

(10) Patent No.: US 6,285,797 B1
(45) Date of Patent: Sep. 4, 2001

(54) METHOD AND APPARATUS FOR ESTIMATING DIGITAL VIDEO QUALITY WITHOUT USING A REFERENCE VIDEO

(75) Inventors: Jeffrey Lubin, New York, NY (US); Michael Henry Brill, Morrisville, PA (US); Albert P. Pica, East Windsor, NJ (US)

(73) Assignee: Sarnoff Corporation, Princeton, NJ (US)

( * ) Notice: Subject to any disclaimer, the term of this patent is extended or adjusted under 35 U.S.C. 154(b) by 0 days.

(21) Appl. No.: 09/543,753

(22) Filed: Apr. 5, 2000

Related U.S. Application Data

(60) Provisional application No. 60/129,132, filed on Apr. 13, 1999.

(51) Int. Cl.[7] .................................................... G06K 9/36
(52) U.S. Cl. ............................................................ 382/254
(58) Field of Search ..................................... 382/100, 254, 382/255, 274, 275, 286

(56) References Cited

U.S. PATENT DOCUMENTS

| | | | |
|---|---|---|---|
| 4,058,828 | 11/1977 | Ladd | 358/80 |
| 4,494,838 * | 1/1985 | Wallquist et al. | 351/206 |
| 4,719,503 | 1/1988 | Craver et al. | 358/12 |
| 5,155,594 | 10/1992 | Bernstein et al. | 358/136 |
| 5,394,483 | 2/1995 | Daly | 382/34 |
| 5,400,667 * | 3/1995 | Feng et al. | 73/865.8 |
| 5,694,491 * | 12/1997 | Brill et al. | 382/260 |
| 5,909,516 | 6/1999 | Lubin | 382/260 |
| 5,974,159 | 10/1999 | Lubin et al. | 382/106 |
| 6,075,884 * | 6/2000 | Lubin et al. | 382/156 |
| 6,137,904 * | 10/2000 | Lubin et al. | 382/162 |

FOREIGN PATENT DOCUMENTS

| | | | |
|---|---|---|---|
| 0 869 684 A2 | 10/1998 | (EP) | H04N/17/00 |
| WO 92/20194 A1 * | 11/1992 | (WO) | H04N/17/00 |

OTHER PUBLICATIONS

Fibush, "Practical Application of Objective Picture Quality Measurements," *SMPTE Journal*, vol. 108, No. 1, pp. 10–19, Jan. 1999.*

Quincy, E., "Video Quality Gradient Measures for Digital Networks," *Proceedings of the Military Communications Conference*, (MILCOM), US, New York, IEEE, Sep. 30, 1990, p. 289–296.

* cited by examiner

*Primary Examiner*—Andrew W. Johns
(74) *Attorney, Agent, or Firm*—William J. Burke

(57) ABSTRACT

A method and apparatus for performing image quality assessment that does not require the use or availability of a reference image. The apparatus comprises a vision preprocessor, a virtual reference generator, a virtual distortion generator, and a image quality metric generator. The vision preprocessor performs a vision-like transformation upon an input image sequence to produce a vision energy map. The virtual reference generator operates upon the vision energy map to produce a virtual reference while the virtual distortion generator produces distortion estimates that are used by the virtual reference generator to produce the virtual reference. The virtual distortion and virtual reference are used by the image quality metric generator to produce a image quality metric for the input video sequence without the use of a reference video sequence.

19 Claims, 3 Drawing Sheets

METHOD AND APPARATUS FOR ESTIMATING DIGITAL VIDEO QUALITY WITHOUT USING A REFERENCE VIDEO

This application claims the benefit of U.S. Provisional Application No. 60/129,132, filed Apr. 13, 1999, which is herein incorporated by reference.

The invention relates to video processing systems and, more particularly, the invention relates to a method and apparatus for estimating digital video quality.

BACKGROUND OF THE DISCLOSURE

A critical need of the digital video industry is the reliable maintenance of the perceived quality of video signals at various points in their creation, encoding, transmission, storage and display. Maintaining video quality requires measuring this quality—reliably, repeatably, and quickly. Current practice uses human observers to assess quality of displayed video, but it is impractical for humans to see into the middle of complicated networks used for video processing or transmission, where quality estimation is now needed to ensure quality is maintained for the end user and to identify sources of error. Therefore, video quality must be estimated automatically for any point throughout a video processing or transmission system.

U.S. patent application Ser. No. 09/055,076, filed Apr. 3, 1998, now U.S. Pat No. 6,137,904 discloses one approach to automated video quality estimation. In this approach, the signal under test (a video sequence) is compared to a reference copy of the same signal to determine the discriminability between these two signals in psychophysical units of Just Noticeable Differences (JNDs).

The reference-based approach to assessing video quality has proven to be accurate and robust in predicting human subjective ratings of video quality over a large range of distortion types and intended signals. However, in digital video networks for such applications as direct broadcast satellite (DBS), cable and Internet distribution, the intended signal (the "reference") is never or rarely available for comparison to the processed or transmitted signal. As such, the present technique is not practical for use in these applications.

Therefore, reliable techniques are needed to assess digital video picture quality under conditions in which a reference signal is not available.

SUMMARY OF THE INVENTION

The disadvantages associated with present techniques for assessing the quality of a video signal are overcome by a method and apparatus for performing image quality assessment that does not require the use or availability of a reference video signal. The apparatus comprises a vision pre-processor, a virtual reference generator, a virtual distortion generator, and a image quality metric generator. The vision preprocessor performs a vision-like transformation upon an input video sequence to produce a vision energy map. The virtual reference generator operates upon the vision energy map to produce a virtual reference while the virtual distortion generator produces distortion estimates that are used by the virtual reference generator to produce the virtual reference. The virtual distortion and virtual reference are used by the image quality metric generator to produce a image quality metric for the input video sequence without the use of a reference image sequence.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The invention provides a robust approach to reference-free, video quality estimation that requires three interacting processes:

1. Characterization of likely signal components within a video sequence (also referred to herein as a video stream);
2. Estimation of position and physical magnitude of likely distortions; and
3. Prediction of subjective magnitude of distortions against each signal. Systems that do not use a reference are generally referred to as single ended, i.e., such an image quality monitoring system is a single ended image quality monitoring system. In contrast, those systems that use a reference are generally referred to as double ended systems.

Figure 1:
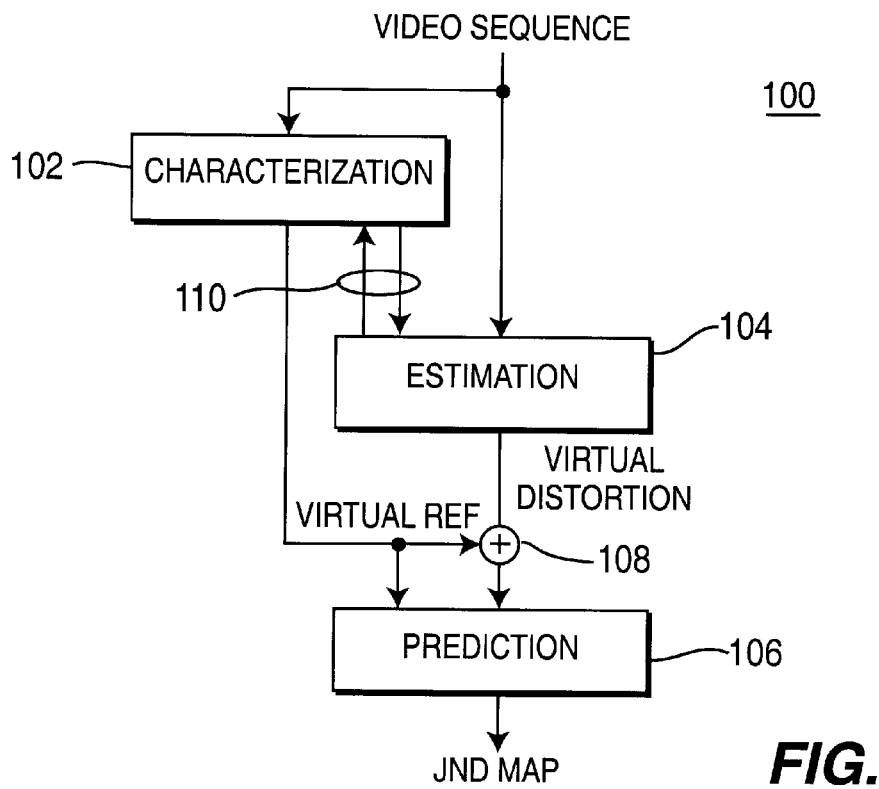
FIG. 1 depicts a high level flow diagram illustrating the operation of a reference-free, visual quality estimator of the present invention.

FIG. 1 depicts a high level flow diagram illustrating the reference free, video quality estimation process 100 (i.e., a single ended process) comprising the foregoing three processes. At step 102, the characterization of likely signals provides a virtual reference, similar to an "internal reference" that helps humans decide if an image is corrupted. In step 104, distortion estimators operating on the input video data provide quantitative estimates of the likely locations and physical magnitudes of "noise"; i.e., distortions of the video stream introduced by encoding, transmission, or other causes. The virtual distortion (noise) is added to the virtual reference using a summer 108 to produce "signal+noise". These estimates of the signal alone (the virtual reference) and signal+noise are then coupled to a Just Noticeable Differences (JND) process of step 106 that generalizes the operation of a known JND Vision Model to allow area-based, rather than just pixel-based, comparison between the signal alone and signal+noise sequences. A known JND Vision Model is disclosed in U.S. patent application Ser. No. 09/055,076, filed Apr. 3, 1998, and incorporated herein by reference in its entirety. The "Local-Area JND Model" allows predictions of the subjective magnitudes of visual distortions, without requiring exact knowledge of the signal or noise.

One feature of the virtual reference characterization process is an optic flow calculation, in which video features determined to represent specific signal components (e.g., moving edges) are tracked across frames of video. This tracking of multiple, noisy samples of the same feature through the video sequence allows statistical extraction of the likely signal that is constant across those samples. This piece of the virtual reference can then be compared to detected distortions (e.g., DCT quantization artifacts, and edge-ringing) in the same video region.

The Local-Area JND Model is also a significant advance over current practice. Instead of a pixel-by-pixel comparison between signal alone and signal+noise, the Local-Area JND Model uses region-based, local-area statistics of signal and noise, accumulated across multipixel and multiframe regions of the video stream. The Local-Area JND Model is needed here primarily because pixel-resolution information of a reference is not reliably available in reference-free applications. However, as will be discussed below, a local-area JND architecture has some important benefits in general, such as in predicting more accurately the visibility of distortions in heavily textured areas of the video stream.

To improve reliability in the reference and distortion estimation processes, the invention also provides a relaxation interaction between the operations of the virtual reference generator and the distortion estimators (represented by arrows 110) and a calibration procedure in which parameters of the reference-free estimator are adjusted with respect to an already-tested reference-based model, using known reference sequences with known, injected distortions.

Figure 2:
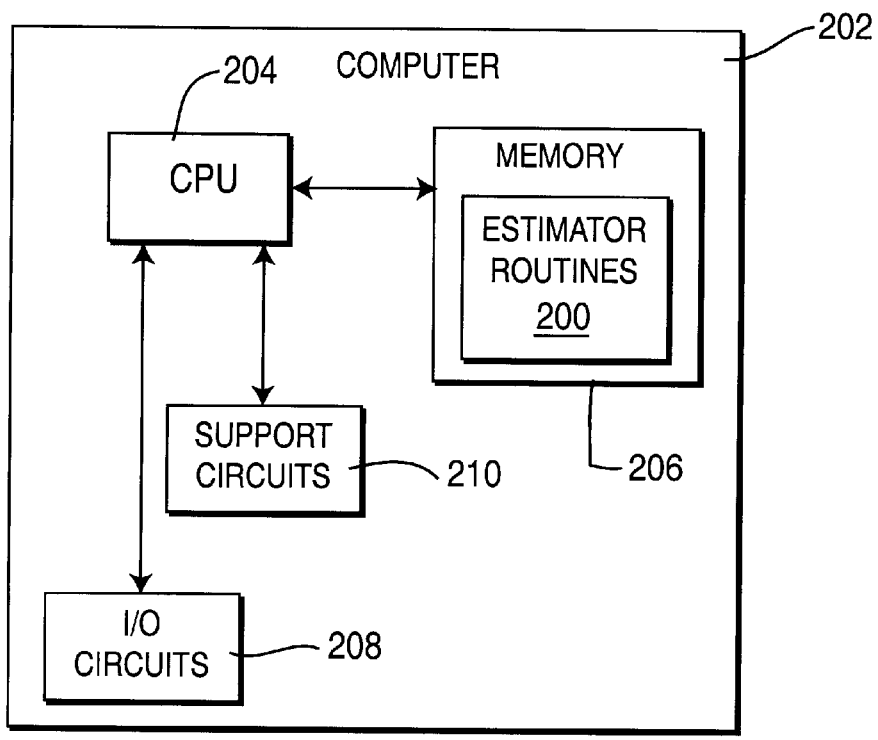
FIG. 2 depicts a block diagram of a general-purpose computer that can be used to implement the present invention.

As depicted in FIG. 2, the estimator 100 of FIG. 1 is generally implemented as a software routine or routines 200 that are executed on a general purpose computer 202. The general purpose computer 202 comprises a central processing unit (CPU) 204, a memory 206, input/output circuits 208, and an assortment of well-known support circuits 210, e.g., clocks, cache, power supplies, and the like. The general purpose computer 202 stores the routines in memory 206, e.g., random access memory, read only memory, disk drives, and the like, until the routines are executed. Execution of the routines 200 transforms the general purpose computer 202 into a specific purpose computer that operates as the reference-free, visual quality estimator 100. The functions of the estimator 100 may be embodied in hardware, software or a combination of hardware and software. Additionally, the functions of the estimator may be embodied in an application specific integrated circuit (ASIC).

Figure 3:
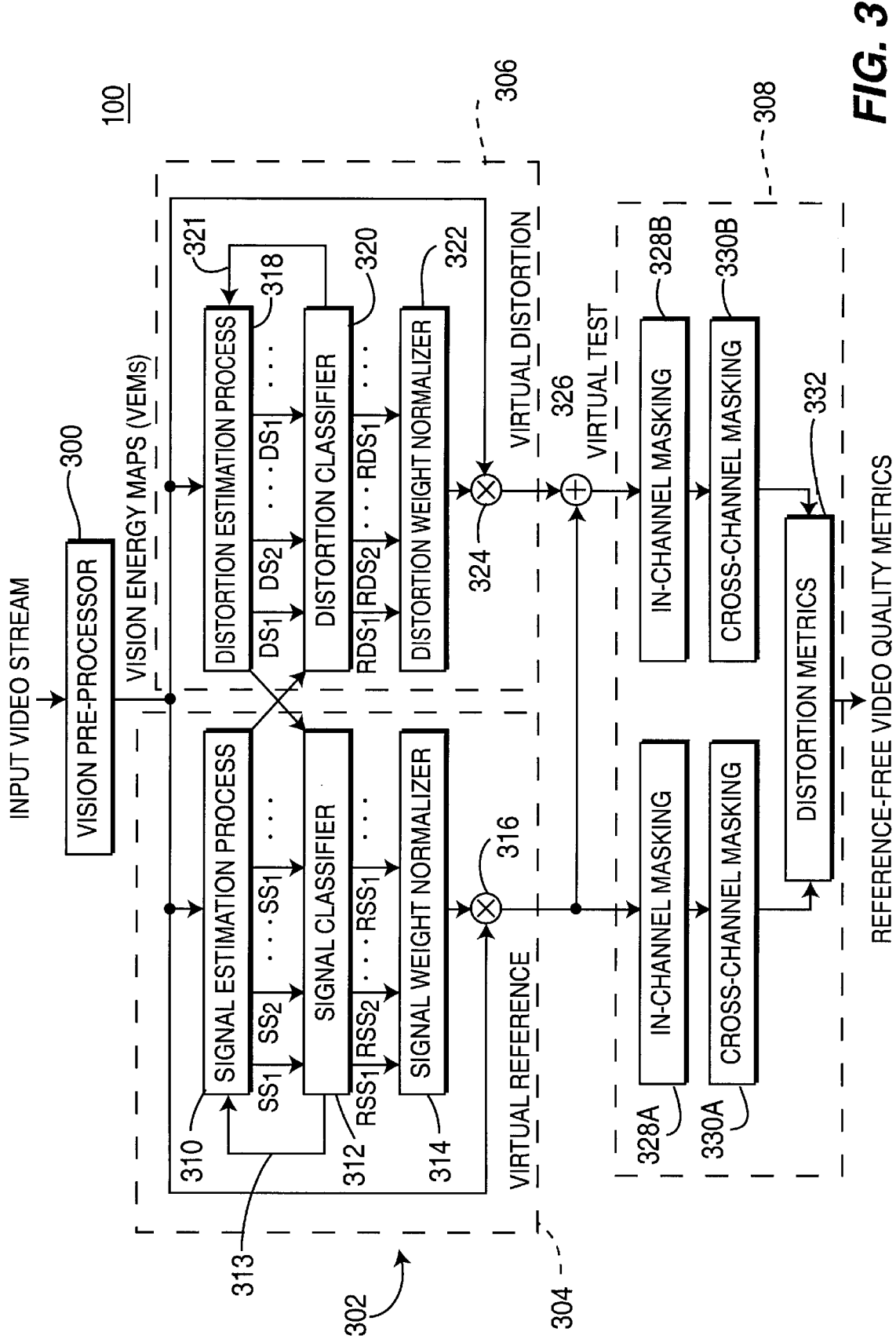
FIG. 3 is a detailed functional block diagram of the reference-free, visual quality estimator of the present invention.

FIG. 3 depicts a functional block diagram of the estimator 100. The estimator 100 comprises a vision pre-processor 300, a virtual reference generator 302, and a video quality metric generator 308. Each component of the estimator 100 is discussed in detail below.

An input video stream enters a vision pre-processor 300 (VPP) that subjects the video, pixel-by-pixel, to a vision-like transformation. This transformation captures the fundamental sensitivity of the human visual system to different spatial and temporal frequencies and spatio-temporal orientations. Specifically, this transformation captures moving-edge responses as well as responses to stationary edges and flickering fields. It is also a one-to-many transformation from pixels to vision-channel representations of these pixels.

The VPP is based on the existing reference-based JND model of U.S. patent application Ser. No. 09/055,076, filed Apr. 3, 1998, but with more generalized spatio-temporal channels (including motion-sensitive filters). Calibration of the VPP is performed using known open-literature psychophysical detection data. The outputs of the model—local, psychophysically weighted space-time contrasts—will have the same JND units as the reference-based model. The output of the VPP at a particular time is a Vision Energy Map (VEM), and the temporal sequence of these maps forms a VEM stream. Each individual value in the map represents a Vision Energy (VE), e.g., an oriented response at one spatial location. The location of this value in the map (channel and spatial position) is a Vision Map Location (VML).

Each VEM is simultaneously coupled to a signal estimation generator 304 and a distortion estimation generator 306 within the virtual reference generator 302. The processes performed by each of these generators consists of a small number (~10) of operators that independently search for various signal-like and distortion-like features in the VEM. The output of each such operator is a set of weights at each VML. Each weight (a number between 0 and 1) indicates the operator's estimate of the fraction of the energy at that location that is attributable to the signal or distortion source that the operator is designed to detect. For each operator, most of the weights will be zero, with relatively small spatio-temporal regions of the VEM stream contributing non-zero weights. The output of any operator, over all VMLs, can thus be thought of as a crude segmentation or clustering of the input VEM stream into regions likely to contain that operator's feature. The "signal segment k" ($SS_k$) is the array of values that signal operator k assigns to a VEM stream. Similarly, the "distortion segment k" ($DS_k$) is the array of values that distortion operator k assigns to a VEM stream.

In the signal estimation process 310 (which contributes to the virtual reference), the operator outputs represent clusters of low-level features predicted to have originated from the same kind of object or feature in the visual scene. Some of these operators include optic flow analysis, stationary edge detection, texture detection, and flat-area detection. For example, optic-flow analysis produces clusters across time, each cluster corresponding to the predicted spatio-temporal path of an individual image feature through successive VEMs. On the other hand, clusters derived from texture segmentation contain multiple VMLs within a relatively large spatial area, each such cluster corresponding to a perceptually coherent local texture. As these examples illustrate, the signal-estimation process 310 is designed to segment the video stream into pieces likely to have derived from different types of perceptually salient features, such as moving edges, highly textured areas, large uniform or slowly varying backgrounds, and the like. An important aspect of this calculation is that the segmentation is not necessarily complete. That is, given a VML for which no signal type can be reliably estimated, no attempt is made to force a classification decision. This ensures, in JND processing to be discussed below, that perceptible distortion magnitudes are estimated only in those regions of the video stream for which reliable estimates of signal and distortion characteristics can be made.

The signal-estimation process 310 relies on knowledge of likely signals in the real world. For example, the fact that objects tend to cohere and move smoothly through time and space places considerable constraints on the calculation of optic flow; i.e., of correspondence between points over time. Well-known pyramid-based (multiresolution) optic flow calculations are used to cluster VMLs over time and space. This clustering allows the likely signal to be extracted by averaging across the VMLs in the cluster. This averaging process is used to extract a virtual reference, against which the perceptibility of various distortions can be assessed.

In parallel with the signal estimation process, the VEMs also undergo a distortion estimation process 318 in which the operators correspond to anticipated distortions from various encoder and transmission systems (e.g., MPEG-2 blockiness, wavelet edge ringing), as well as to more generic types of distortion (e.g., noise and blur). Note that whereas the signal operators can and should be designed to take into account the properties of likely signals (e.g., smooth motion constraints on coherent objects in optic flow analysis), the distortion operators are anticipated to be based on simpler, more standard image processing techniques for matching filters to known distortion features. Also, as with the signal operators, the distortion operators are not required to cover completely the VEM stream. For example, in very high quality video, there should be many VMLs with no non-zero distortion operator weights.

The distortion estimation process 306 include filter-like operators matched to likely distortions. Specific techniques include:

Extraction of low-amplitude peaks of the Hadamard transform, at code-block periodicities (useful in deciding there is a broad uniform area with added JPEG-like blockiness).

Scintillation detection, useful for determining likely artifacts in the neighborhood of moving edges.

Pyramid and Fourier decomposition of the signal to reveal macroblock artifacts (MPEG-2) and wavelet ringing (MPEG-4).

In the signal and distortion estimation generators 304 and 306, the various operator outputs are derived independently of each other and coupled to the signal classifier 312 and the distortion classifier 320. In the distortion classifier 320 and signal classifier 310, these independent estimates are subjected to a relaxation process in which strong signal weights modulate the distortion weights, and each other; similarly, strong distortion weights modulate the signal weights and each other. For example, scintillation in the image should be given a high distortion operator weight if the scintillating area is identified as a moving edge by a signal operator. The output of the distortion classifier 320 is a set of revised weights (comprising revised distortion segment k, or $RDS_k$) on the distortion operator outputs. Similarly, the initial distortion weights $DS_k$ modulate the signal operator weights SSk, controlling the signal-classifier 312 that revises the signal operator outputs (to produce revised signal segment $RSS_k$). For example, blockiness detected in a uniform area of the video (as determined by a signal operator) should be given added weight. The revised signal and noise weights are then passed again through the reweighting process. This relaxation process continues (represented by paths 313 and 321) until a stable set of weights is obtained for both signal and distortion, or until another stopping criterion is reached. To ensure computational speed, no more than two or three iterations of the relaxation are generally permitted.

Also at this stage, weights for individual types, or channels, of the VEM stream (e.g., oriented edges at particular spatio-temporal frequencies) within a derived signal or distortion region may be replaced with region averages for each channel. In particular, in textured regions the percept is governed largely by the overall statistics of channel energies within that region, rather than by particular energies at particular spatio-temporal locations. Therefore, region-averages will produce more reliable estimates of perceptible distortions within each region.

For each VML, the classifier outputs $RSS_k$ and $RDS_k$ are respectively coupled to a signal weight normalizer 314 and a distortion weight normalizer 322. The classifier outputs are normalized to comprise a set of weights across all signal and distortion operators, such that these weights sum to unity (except where no signal or distortion has been reliably detected). These weights indicate an estimate of the fraction of the energy in each VEM that is due to each of the signal and distortion types to which the signal and distortion processes 310 and 318 are sensitive.

Next, for each VEM, all the signal weights $RSS_k$ are summed over k to produce an array of signal weights RSS, indicating the fraction of the energy in each VML estimated to be due to signal of any kind. Similarly, all the distortion weights $RDS_k$ are summed over k to generate an array RDS of fractions of the energy in each VML due to distortion. The weights RSS are then multiplied (using multiplier 316) by the VEM, component-wise over all VMLs, to produce an array representing the energies in that VEM due to signal (signal energy, or SE). This array is called the virtual reference. The virtual reference is a replacement for a sequence of actual reference images. Analogously, a separate array that represents the energy due to distortion DE is computed by multiplying, in multiplier 324, the RDS with the VEM. Simple addition in adder 326 of the two arrays SE and DE produces an estimate of the VEM energies due to signal+distortion. This signal is called the virtual test. Note that in many cases (i.e., except for areas in which neither signal nor distortion has been reliably estimated), the value of SE+DE at any VML equals the total energy in that VML.

Figure 4:
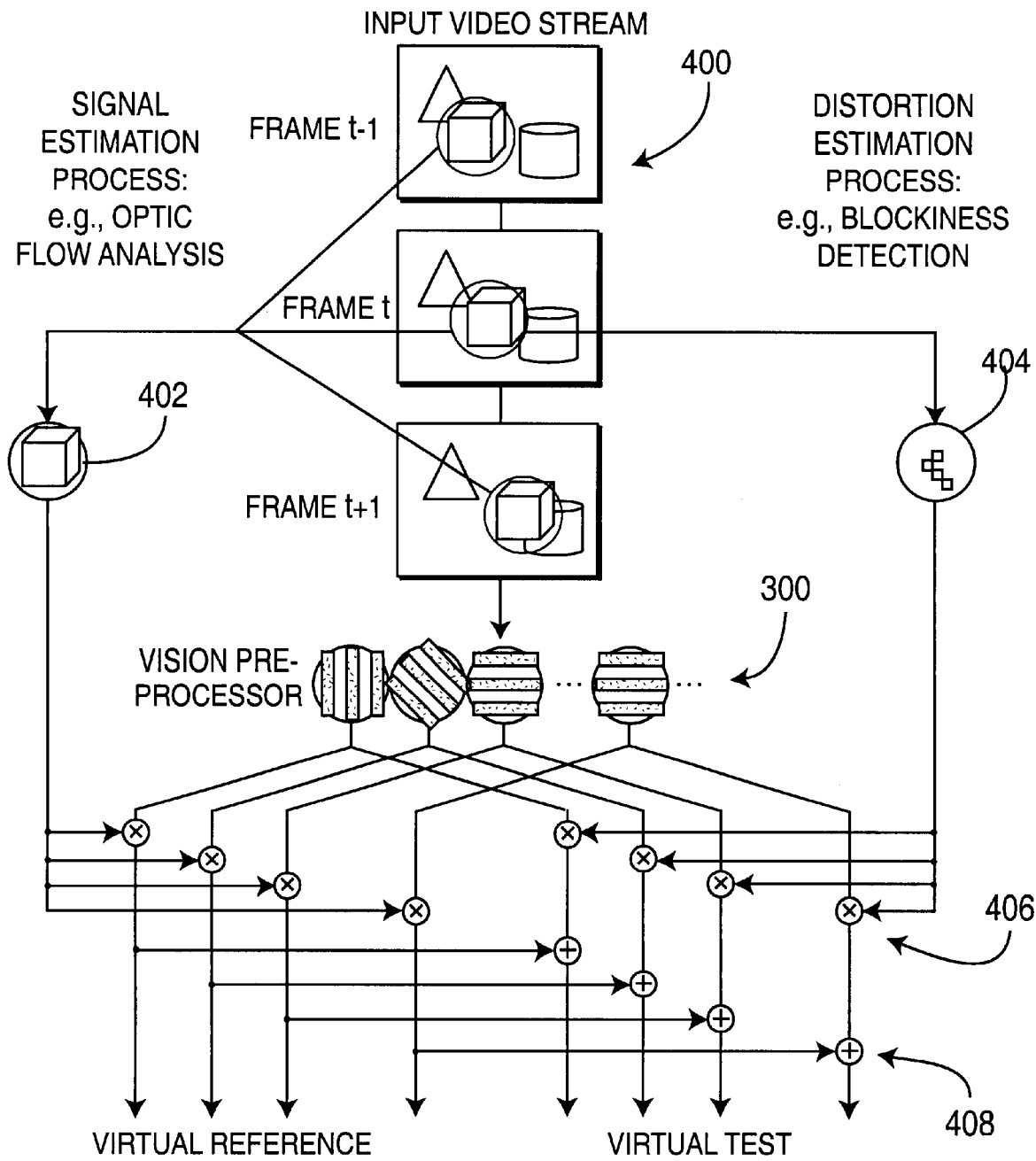
FIG. 4 depicts a flow diagram of a process for producing a virtual reference for use in the estimator of FIG. 1.

FIG. 4 diagrammatically illustrates an example of the processes by which typical signal and distortion estimators extract the virtual reference and virtual test from the input video stream. In this example, optic flow analysis in the signal estimation process tracks the moving cube from the three frames of video 400, and extracts the intended signal 402 from three frames of source video 400. At the same time, a blockiness distortion estimator identifies the block-like distortions 404 in one frame of the video (frame t). Then, as indicated by the multiplication points 406 in the figure, the signal and distortion estimators independently weight the energies in individual VMLs from the VEM stream produced by the vision preprocessor 300, generating a virtual reference and the distortion components that are then added in adders 408 to the virtual reference to produce the virtual test.

Note that this figure illustrates the operation of only one signal estimator and one distortion estimator. In the actual implementation, multiple signal and distortion estimators operate in parallel, and their estimates are refined via the signal and distortion classifiers shown in FIG. 3 and described above. Note also that although the dashed lines in FIG. 4 show the signal and distortion estimators operating directly on the video stream, this is for illustrative purposes only: in a practical implementation, these operators take their inputs from the VEM stream, rather than directly from the video.

Returning to FIG. 3, after extracting the signal and distortion energies from each area of the video stream, the estimator 100 computes, using the video quality metric generator 308, a metric of visual quality by comparing the signal energies with signal+distortion energies. The metric of comparison itself is patterned after previous vision modeling, and also the vision pre-processor 300 captures the low-level visual constraints such as the human spatio-temporal frequency sensitivity. In effect, the signal and distortion estimation computations are sandwiched between two vision-model components: low-level vision (e.g., computation of the VEM) to make the algorithm consistent with simple psychophysical experiments, and highlevel visual comparison to synthesize the feature-vector components into a single quality judgment.

From this point on in the processing, a JND architecture of the type disclosed in U.S. patent application Ser. No. 09/055,076, filed Apr. 3, 1998 can be used. For each VML, the separate values of signal alone and signal+distortion energy corresponds to the separate values of reference and reference+test as computed in each front-end unit of a reference-based JND model. As in the reference-based model, these two energies are then subjected, component-by-component, to a nonlinear transformation called in-channel masking 328A and 328B. This masking imposes a metric on each energy that emphasizes energy changes in a mid-range and de-emphasizes energy changes when the energy values are very high. This transformation de-emphasizes further changes in signal (or noise) components when they reach a certain strength.

The in-channel masking is followed by cross-masking 330A and 330B, whereby energies from different VMLs suppress each other. One purpose of this operation is to simulate the perceptual effect that changes are less perceptible on a busy background.

Finally, the transformed VEMs are compared by a perceptual distortion metric 332, and the result is an estimated quality rating. The comparison of extracted signal and signal+distortion is tantamount to comparing the input video stream to a virtual reference. However, it is not strictly a noise-cleaning process, because a noise-cleaned video cannot be retrieved from the incomplete signal statistics derived from the signal estimation and classifier processes.

Using the reference-based vision model in lieu of experimental data can eliminate many of the experiments that would otherwise be needed to calibrate the reference-free model (both basic psychophysics and subjective rating of real videos). This streamlining of effort is possible because the reference-based model has been tested to the extent of being a trustworthy proxy for real data. This model-based calibration selects a set of distorted videos, compare them with their undistorted counterparts through the reference-based model, use the distorted videos alone as inputs to the reference-free model, and set parameters within that model to achieve the best correlation of reference-free with reference-based outputs. Through this calibration, the reference-free model inherits the fundamental-vision attributes of the reference-based model. This improves the robustness of the reference-free model.

At four points, the estimator 100 is tested against real-world rating data or against their proxy through a trusted reference-based vision model.

1.) The vision pre-processor 300 is tested against the corresponding components of the reference-based vision model to make sure the reference-free model is calibrated. Also, as added insurance of accuracy, the VPP is calibrated against open-literature psychophysical detection data.

2.) The separation of the test video into signal and distortion (signal and distortion) is tested as follows: (a) send highly distorted video through the reference-based vision model and test that the distortion feature components are high and the signal components are low; and (b) send an undistorted video through the model and test that the distortion components are low and signal components are high. A finer-grained evaluation is also performed by examining the places in the video to which the model assigns particular signals and distortions.

3.) The masking that takes place after the signal and distortion features are computed is tested by comparing two metrics: the reference-free model output from distorted video alone; and the reference-based model output from both the distorted video and its undistorted counterpart. The criterion for satisfactory correspondence is dictated by comparing the Double Stimulus Continuous Quality Scale (DSCQS) and single-stimulus ratings of the same videos.

4.) Comparison of the total model output with new, reference-free rating data provides the final test of the reference-free algorithm. The rating data is obtained using a database of distorted videos with representative kinds of imagery, and selected modes of distortion. The videos include typical textures such as grass and carpets, moving and stationary edges, and broad uniform areas. The distortions include adding point-like noise, compressing the video using MPEG-2 and MPEG-4, and incurring blur and flicker. The rating scale is a single-stimulus analogue of the DSCQS, documented in the ITU Rec. 500-8. Single distorted videos (the same ones used in the rating experiments) are passed through the estimator, and the estimated quality ratings are compared with the reported subjective ratings.

Once calibrated, the reference-free estimator 100 can be used to estimate image quality in application where a reference video is not available. As such, internal video processing components of a video transmission system or digital video studio can be tested for their effect upon video quality.

Although various embodiments which incorporate the teachings of the present invention have been shown and described in detail herein, those skilled in the art can readily devise many other varied embodiments that still incorporate these teachings.

What is claimed is:

1. Apparatus for estimating human subjective assessment of picture quality of an image comprising:
   a single ended image quality monitoring system, wherein said single ended image quality monitoring system comprises:
   a vision pre-processor;
   a virtual reference generator coupled to the vision pre-processor; and
   a image quality metric generator coupled to said virtual reference generator.

2. The apparatus of claim 1 wherein said vision pre-processor performs a vision-like transformation upon the image to produce a vision energy map.

3. The apparatus of claim 1 wherein said virtual reference generator comprises:
   a signal estimation processor;
   a signal classifier; and
   a signal weight normalizer.

4. The apparatus of claim 1 further comprising a virtual distortion generator.

5. The apparatus of claim 4 wherein said distortion generator comprises:
   a distortion estimation processor;
   a distortion classifier; and
   a distortion weight normalizer.

6. The apparatus of claim 1 wherein said image quality metric generator further comprises a local-area just noticeable difference model.

7. The apparatus of claim 6 wherein said local area, just noticeable differences model uses local area statistics of signal and noise accumulated across multiple pixels and multiple frames of the video sequence.

8. A method of estimating image quality of a image sequence comprising:
   pre-processing said image sequence using a vision-like transformation to produce a vision energy map;
   generating a virtual reference from said vision energy map; and
   producing a image quality metric from said virtual reference.

9. The method of claim 8 wherein said virtual reference generating step further comprises:

signal estimation;

signal classification; and signal weight normalization.

10. The method of claim 8 further comprising generating a virtual distortion.

11. The method of claim 10 wherein said distortion generating step comprises:

distortion estimation;

distortion classification; and distortion weight normalization.

12. The method of claim 8 wherein said image quality metric generating step further comprises performing a local-area just noticeable difference computation.

13. The method of claim 12 wherein said local area, just noticeable differences computation uses local area statistics of signal and noise accumulated across multiple pixels and multiple frames of the video sequence.

14. A computer readable medium comprising software that, when executed by a computer causes a image quality assessment system to perform a method comprising:

pre-processing said image sequence using a vision-like transformation to produce a vision energy map;

generating a virtual reference from said vision energy map; and producing a image quality metric from said virtual reference.

15. The method of claim 14 wherein said virtual reference generating step further comprises:

signal estimation;

signal classification; and signal weight normalization.

16. The method of claim 14 further comprising generating a virtual distortion.

17. The method of claim 16 wherein said distortion generating step comprises:

distortion estimation;

distortion classification; and distortion weight normalization.

18. The method of claim 14 wherein said image quality metric generating step further comprises performing a local-area just noticeable difference computation.

19. The method of claim 18 wherein said local area, just noticeable differences computation uses local area statistics of signal and noise accumulated across multiple pixels and multiple frames of the video sequence.

* * * * *